United States Patent [19]
Shipp

[11] Patent Number: 5,647,302
[45] Date of Patent: Jul. 15, 1997

[54] ANIMAL DENTAL HYGIENE DEVICE

[76] Inventor: Anthony D. Shipp, 351 N. Foothill Rd., Beverly Hills, Calif. 90210

[21] Appl. No.: 516,408

[22] Filed: Aug. 17, 1995

[51] Int. Cl.$^6$ .................................................. A01K 29/00
[52] U.S. Cl. ........................................ 119/709; 606/235
[58] Field of Search ................................ 119/707, 709, 119/710; 606/234, 235; 411/908, 389, 392, 395

[56] References Cited

U.S. PATENT DOCUMENTS

| | | |
|---|---|---|
| Re. 34,352 | 8/1993 | Markham et al. . |
| D. 234,789 | 4/1975 | Rosenberg . |
| D. 234,790 | 4/1975 | Rosenberg . |
| D. 256,958 | 9/1980 | Markham . |
| D. 333,937 | 3/1993 | Prosser . |
| D. 337,398 | 7/1993 | Axelrod . |
| D. 349,786 | 8/1994 | Markham . |
| 670,487 | 3/1901 | Van Wagner . |
| 1,006,182 | 10/1911 | Cousin . |
| 1,149,170 | 8/1915 | Allis . |
| 2,131,229 | 9/1938 | McMennamin . |
| 2,185,547 | 1/1940 | Fowler . |
| 2,194,736 | 3/1940 | de Bruler . |
| 2,966,908 | 1/1961 | Cathcart et al. . |
| 3,071,476 | 1/1963 | Werft et al. . |
| 3,102,447 | 9/1963 | Gregory et al. ........................ 411/392 |
| 3,198,173 | 8/1965 | Fisher . |
| 3,830,202 | 8/1974 | Garrison . |
| 3,943,818 | 3/1976 | Pryor et al. ............................ 411/389 |
| 4,149,815 | 4/1979 | Kawam . |
| 4,304,503 | 12/1981 | Gehring et al. ........................ 411/389 |
| 4,513,014 | 4/1985 | Edwards . |
| 4,557,219 | 12/1985 | Edwards . |
| 4,585,416 | 4/1986 | DeNiro et al. . |
| 4,802,444 | 2/1989 | Markham et al. . |
| 4,928,632 | 5/1990 | Gordon .................................. 119/709 |
| 5,027,796 | 7/1991 | Linzey . |
| 5,033,410 | 7/1991 | Sigurdsson . |
| 5,174,243 | 12/1992 | O'Rourke . |
| 5,249,961 | 10/1993 | Hoagland . |
| 5,263,436 | 11/1993 | Axelrod . |
| 5,329,881 | 7/1994 | O'Rourke . |
| 5,342,398 | 8/1994 | Sun ........................................ 606/234 |
| 5,472,302 | 12/1995 | Yandle, II .............................. 411/395 |

FOREIGN PATENT DOCUMENTS

| | | | |
|---|---|---|---|
| 2083217 | 12/1971 | France .................................. 119/710 |
| 1957185 | 5/1971 | Germany . |
| 7810061 | 10/1977 | Netherlands . |
| 20558990 | 4/1981 | United Kingdom .................. 411/392 |
| 2271705 | 4/1994 | United Kingdom . |

*Primary Examiner*—Todd E. Manahan
*Attorney, Agent, or Firm*—Lyon & Lyon LLP

[57] ABSTRACT

An animal dental hygiene device includes a bone-shaped body, made of a tough rubber-like material into which is formed a plurality of opposing spiral grooves.

8 Claims, 4 Drawing Sheets

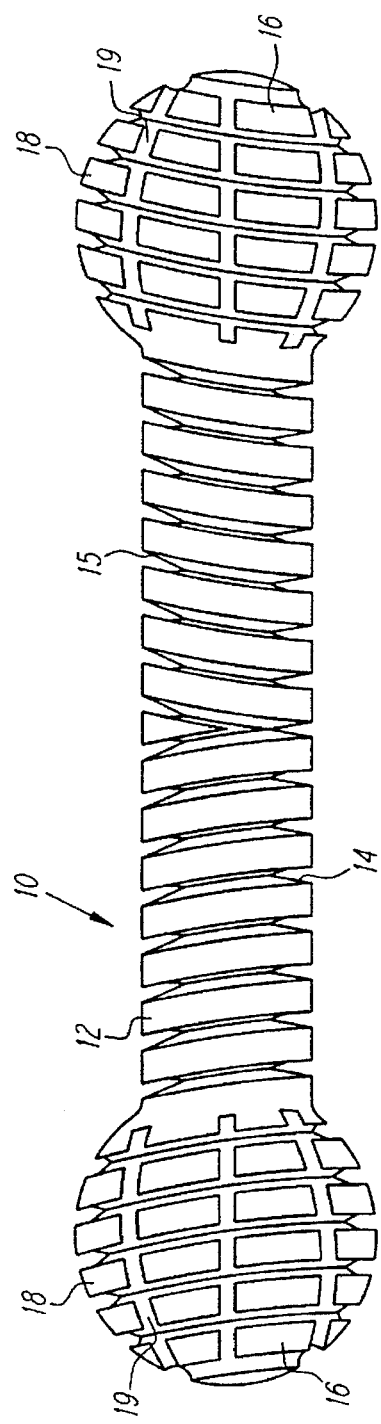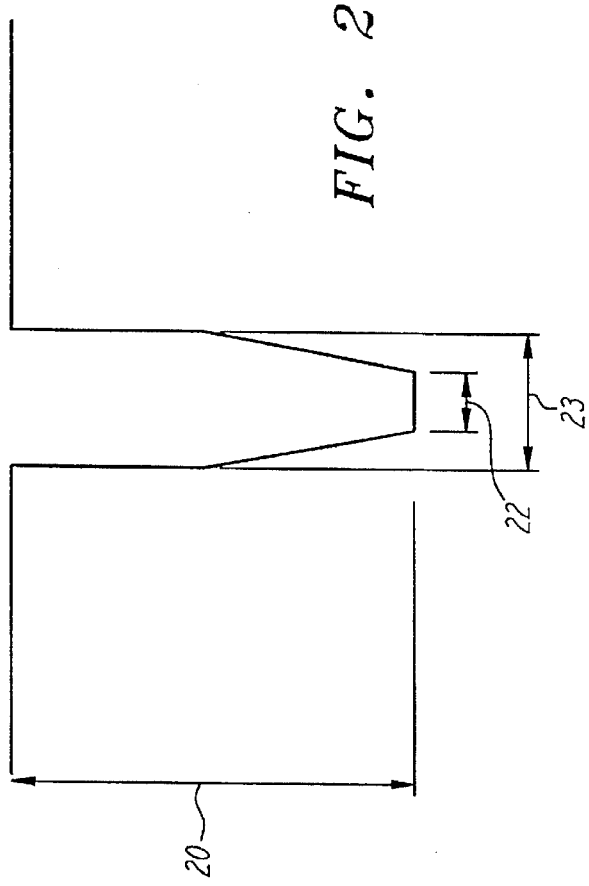

ANIMAL DENTAL HYGIENE DEVICE

BACKGROUND OF THE INVENTION

1. Field of the Invention

This invention relates to devices used for the cleaning of animal teeth and gums.

2. Background Information

Cleaning of teeth is very important because unclean teeth are primarily responsible for the most common disease encountered in human and animal medicine—gingivitis and periodontal disease (or periodontitis). Periodontal disease is a term used to describe diseases of the tooth attachment apparatus, the gums, tooth roots, bone surrounding the teeth, and the periodontal ligament tissue joining tooth to bone. Symptoms range from gum inflammation (gingivitis), formation of plaque (food and bacteria), and bad breath (halitosis), to serious accumulation of tartar (mineralized plaque), bleeding, receded or eroded gums, loose or infected teeth, and eventual loss of teeth. Periodontal disease is also the major cause of bad breath in human beings, dogs, and cats. If untreated, periodontal disease often leads to severe damage of major organ systems, and can shorten the life of the afflicted animal. Thus, teeth cleaning is essential to good health.

The permanent dentition of the dog comprises of 42 teeth, compared to 32 teeth in human beings. There are four different types of teeth, the incisors, the canine teeth (fangs), the premolars and the molars. Incisor teeth are predominantly used for grabbing (prehending) food and grooming (nibbling skin). Canine teeth (fangs) are predominantly used for defense and attack, and tearing apart flesh into smaller pieces in order to eat. Premolar teeth are predominantly used for shearing food into smaller chunks. Molar teeth are predominantly used to grind and chew food into smaller pieces that can be swallowed.

When a dog chews food or objects (such as chewing devices), most of this action involves the posterior (caudal) teeth. More specifically the teeth used in this action are the carnassial teeth. The carnassial teeth consist of the upper fourth premolars and the lower first molars.

Due to the shape and arrangement of the posterior (caudal) teeth and due to the openings of the zygomatic and parotid salivary ducts (just above the upper posterior (caudal) teeth), dental plaque and tartar (calculus) accumulate more predominantly on the posterior (caudal) teeth, especially the upper posterior (caudal) teeth. Also, plaque and tartar (calculus) accumulates most commonly on the lateral (buccal) surfaces of the posterior (caudal) teeth. More specifically, tartar (calculus) accumulates most commonly on the lateral (buccal) surfaces of the upper third premolar, the upper fourth premolar, the upper first molar, the lower fourth premolar and the lower first molar. Wild animals keep their teeth relatively clean because they have to work at their food. When they tear a carcass apart to eat, there is considerable abrasion of the teeth by the skin, flesh, tendons, bones and hair of the prey.

Today's pets have the benefit of complete and nutritionally balanced diets, but its presentation in either canned or dried form is not the same as a "natural" diet. Today's canned foods are the main problem. They are sticky and do nothing to clean the teeth. Dry food or biscuits may help slightly in cleaning the teeth, but are still not very effective. Tongue movement, during and after eating and while panting, can help keep the medial (lingual) surfaces clean to a slight extent.

Domestic dogs and cats have a remarkably similar incidence of dental disease to people. Toothbrushing, with a special pet toothbrush and pet toothpaste, is one good way to control or prevent dental disease. Other oral hygiene aids, in conjunction with brushing, may improve the results. However, since toothbrushing of pet's teeth is not usually complied with properly by most people, other oral aids, that the pet can use by itself, become more important. Chew sticks, rubber toys and other so called oral aids, do not help much in cleaning the lateral (buccal) or medial (lingual or palatal) surfaces of the teeth, or under the gumline, where the plaque and tartar (calculus) accumulates most commonly. When an animal chews on such objects, they contact the tips of the teeth, but do not contact the side of the teeth.

Therefore, a need was perceived for an animal dental hygiene device which a pet could use by itself and which would effectively clean animal's teeth and under the gumline.

SUMMARY OF THE INVENTION

The present invention is directed to an animal dental hygiene device having spiral grooves to help clean an animal's teeth and under the gumline. A dental hygiene device having features of the present invention comprises an elongated, bone-shaped body made of a flexible, but tough, rubber-like material such as polyurethane. Formed within the body is one or more specially shaped and positioned spiral grooves into which the animal may sink its teeth. When the animal bites into the grooves, the teeth will be gently scraped and cleaned by the grooves. Further, the area under the gumline will also be cleaned as the grooves contact the gums.

In another inventive aspect, the present invention may be constructed with a hollow core along a longitudinal axis. This hollow core will allow a rope or other slender strip of material to be threaded through the hollow core in order to make the device larger and thus more difficult for a dog or other animal to swallow.

Accordingly, it is an object of the present invention to provide an animal dental hygiene device. Other and further objects and advantages will appear hereinafter.

BRIEF DESCRIPTION OF THE DRAWINGS

It is to be understood that the accompanying drawings are provided for the purpose of illustration only, and are not intended as a definition of the limits of the invention. The drawings illustrate a preferred embodiment of the present invention in which:

FIG. 1 is an elevation view of an animal dental hygiene device in accordance with the present invention;

FIG. 2 is an enlarged detail view of a groove of the animal dental hygiene device of FIG. 1;

DETAILED DESCRIPTION OF THE PREFERRED EMBODIMENT

Figure 3:
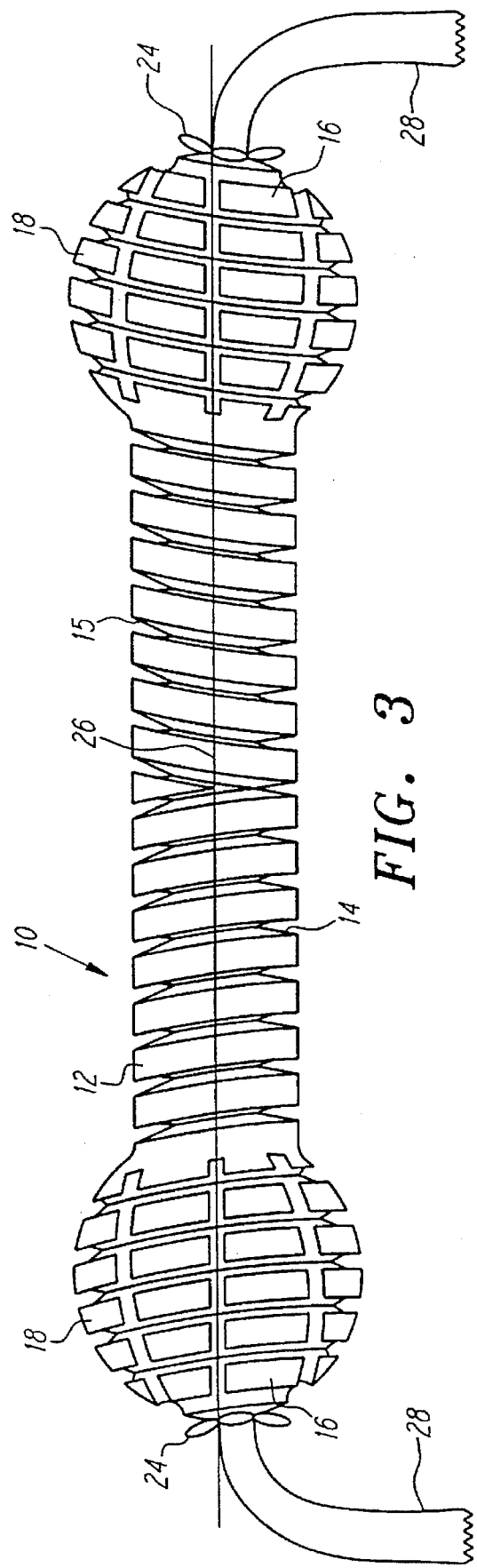
FIG. 3 is an elevation view of an animal dental hygiene device including a strip of material along the device's longitudinal axis.

Referring to the drawings, FIG. 1 shows an animal dental hygiene device 10 in accordance with the present invention.

The animal dental hygiene device 10 comprises a body 12 formed of a tough, rubber-like material such as polyurethane. Formed within the body 12 is at least one groove 14. In the preferred embodiment, the body 12 also contains bulbous portions 16 on each end of the body 12 to make the device 10 appear more bone-like. The bone-like appearance is thought to make the device 10 more appealing to animals, encouraging them to use it. Additionally, some animals appear to prefer chewing the bulbous portions 16 of the dental hygiene device 10. The use of a tough rubber-like material such as polyurethane is advantageous, as the material allows the animal to bite into a flexible material, while being strong enough to prevent the strong forces of a typical dog's jaw (ranging from 800 to 2000 p.s.i.—depending on breed) from biting through and damaging the device 10.

Figure 5:
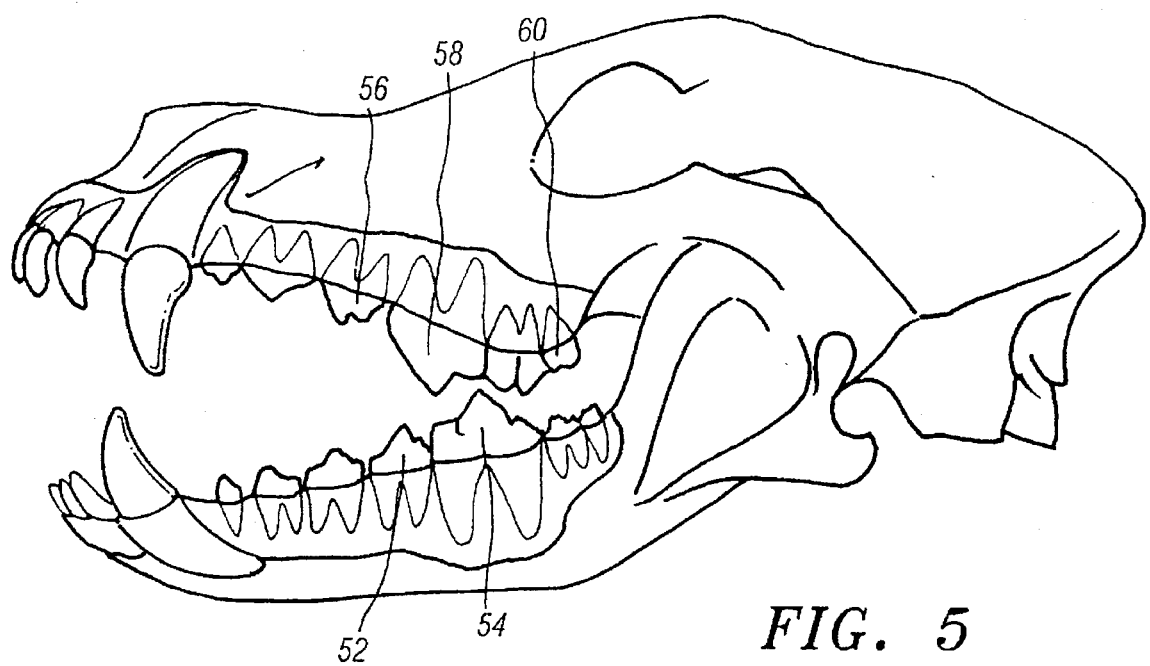
FIG. 5 is an elevation view illustrating canine dentition.
Figure 6:
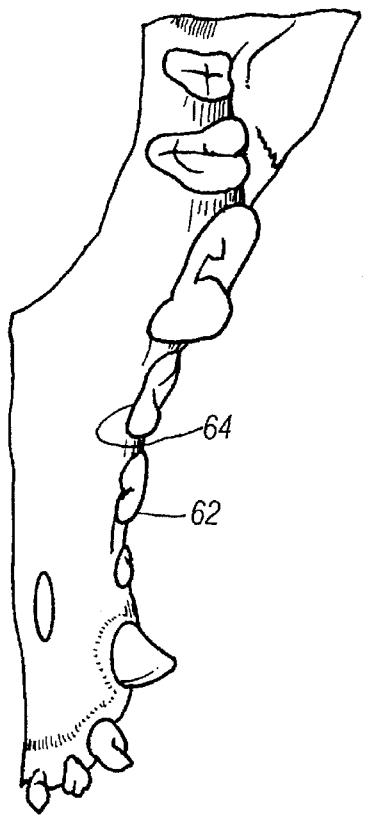
FIG. 6 is a plan view depicting canine dentition.

Turning now to the details of the groove 14, as shown in FIG. 1, the groove 14 is advantageously formed in a spiral pattern which may continue along the length of the body 12. In one embodiment, a single groove 14 continues along the length of the body 12 encircling the body 12. This groove 14 arrangement tends to ensure that when the device 10 is chewed between a dog's upper and lower posterior (caudal) teeth, both the upper and lower teeth will be inserted into the groove 14. By way of illustration, the permanent dentition of a dog is shown in FIGS. 5 and 6. Since the posterior (caudal) teeth, especially the carnassial teeth, are arranged in an overlapping (or scissor) bite, the lower posterior (caudal) teeth, especially the fourth premolar 52 and the first molar 54, will fit in the groove 14 at the same time as the upper posterior (caudal) teeth, especially the third premolar 56 and fourth premolars 58 and the first molar 60. Thus, as the mouth closes, the side of the groove 14 will be forced against the lateral (buccal) 62 and medial 64 (lingual and palatal) surfaces of the posterior (caudal) teeth, thus scraping and cleaning their surfaces. Due to the flexible spiral shape, the upper and lower posterior (caudal) teeth will tend to insert between the grooves 14 at the same time. By contrast, a design not using a spiral shape may not allow the upper and lower teeth to be cleaned simultaneously. In a non-spiral design, the upper teeth may not fit into grooves when the upper teeth are placed in grooves and vice-versa.

Figure 4:
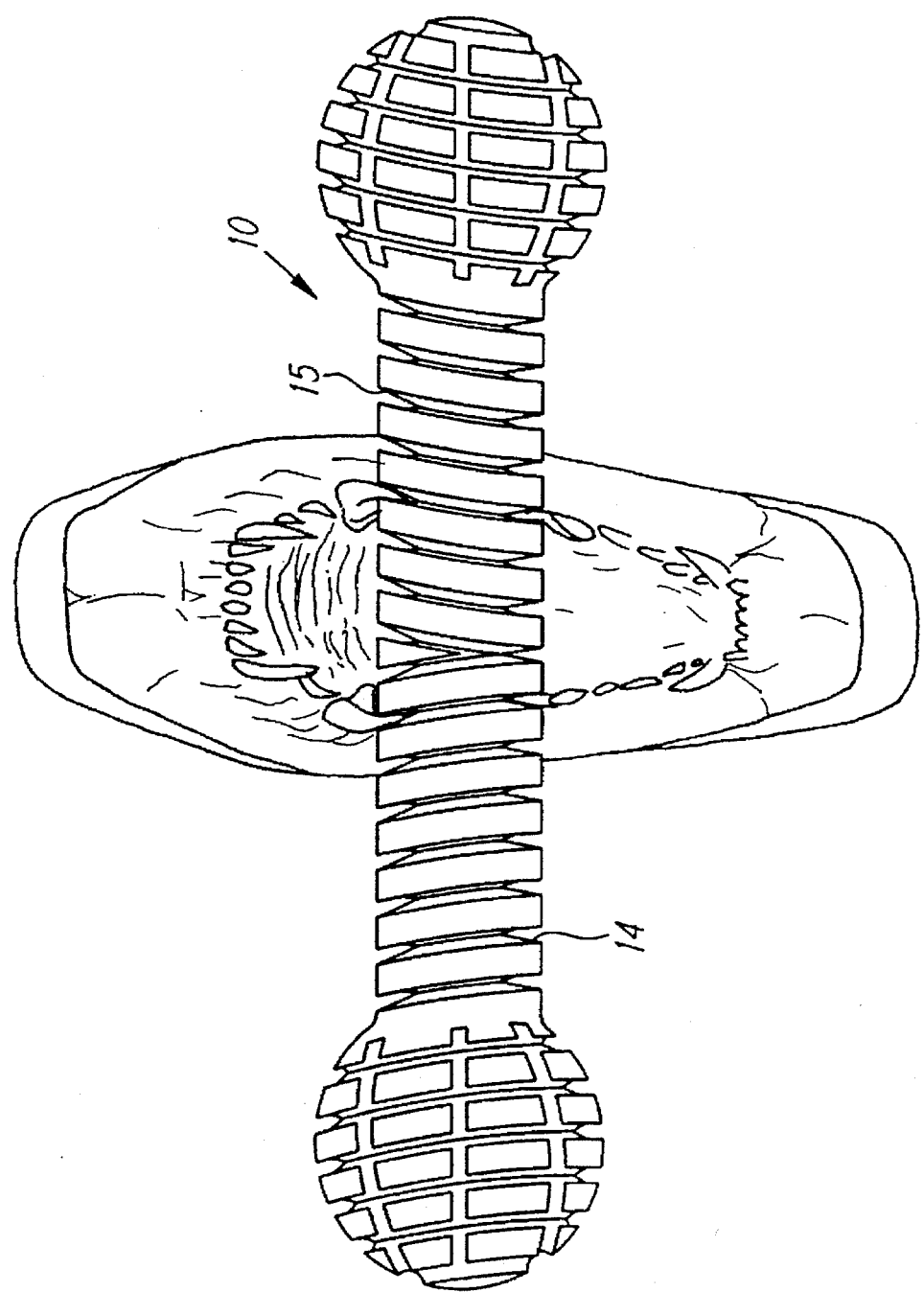
FIG. 4 is an elevation view of the dental hygiene device of FIG. 1 illustrating how an animal's upper and lower teeth may simultaneously engage the device.

In the preferred embodiment, rather than having a single spiral groove 14 encircling the body 12, two sets of spiral grooves, 14 and 15 encircle the body 12. In this embodiment the spiral grooves 14 and 15 spiral the body 12 in different directions, at angles opposing each other. The spiral groove 14 may be thought of as spiraling in a clockwise direction, while the spiral groove 15 may be thought of as spiraling in a counter-clockwise direction. Animal jaws typically taper from wide in the posterior region to narrow in the front, as shown in FIG. 6. A single spiral 14 encircling the body 12 may therefore, conform to the tapered angle of one side of the animal's jaw. However, the angle of the spiral 14 will not necessarily conform to the other side of the animal's jaw. Because the spiral grooves 14 and 15 together reflect the tapering nature of an animal jaw, they advantageously conform more closely to the arrangement of teeth in the typical animal jaw than spiral grooves 14 which do not oppose each other. The manner in which the opposing spiral grooves conform to the shape of an animal's jaw is best shown in FIG. 4.

Because there are many different shapes, sizes and variations of the jaws of dogs and other animals, depending upon the species or breed, the device 10 advantageously is formed in different sizes appropriate to the size of the animal. The different sizes are based on the lengths and widths of the posterior (caudal) teeth, as well as the distance between the scissor bite of the carnassial teeth. The device 10, thus, helps prevent gingivitis, periodontal disease, tooth loss, abscessation, pain, owner expense, and animal discomfort.

Since the average length of the largest posterior (caudal) teeth, (from gum to tip of the crown), is approximately twice that of the average width of the largest posterior (caudal) teeth, (from lateral (buccal) to medial (lingual or palatal) surface), the depth 20 and width 22, 23 of the groove 14, 15 is advantageously formed accordingly, as shown in FIG. 2. Since it is advantageous that the tooth penetrate the groove 14, 15 to a deeper extent than the length of the tooth, in order to aid in cleaning the tooth below the gumline, as well as massaging the gum margin, the depth 20 of the groove 14, 15 is preferably deeper than the average length of the tooth.

The width 23 of the groove 14, 15 may preferably be about one-half of the width of the average large posterior (caudal) tooth. This allows for a tight fit when the tooth is about half way into the groove 14, 15. Due to the expandable nature of the material of the device 10, as well as the flexible spiral grooves 14, 15 involved, the tooth generally will be able to penetrate to the depth of the groove 14, 15. At the tooth's full length, the groove 14, 15 may then begin to clean the part of the tooth at and below the gumline. This cleaning action may also stimulate and massage the gums.

Since the crowns of most of the posterior (caudal) teeth are tapered from the gum level to the tip, the grooves 14, 15 may taper inwardly, starting about half way down. This tapering helps in cleaning the tapered tip of the tip of the tooth, as it penetrates deep into the groove 14, 15. Proportionally, the width 22 of the groove 14, 15 at its full depth 20 is about one-half the width 23 of the groove 14, 15 at its widest part.

As shown in FIG. 3, the dental hygiene device 10 may be constructed with a hollow core 24 along a longitudinal axis 26 which allows a rope 28 or other slender strip of material to be threaded through the hollow core in order to make the dental hygiene device 10 larger and more difficult for a dog or other animal to swallow. The rope 28 or other slender strip of material may be secured to the dental hygiene device 10 by conventional means. For example, the rope 20 may be knotted on either end of the dental hygiene device 10. Alternatively, the rope 28 may be glued or cemented to the dental hygiene device 10.

In another aspect, the bulbous portions 16, may contain protrusions 18. These protrusions 18 are preferably approximately as long or longer than the teeth of the animal that will chew on the device 10. These protrusions 18 may take the form of knobs, cones, or elevated portions of grooves formed in the bulbous portions 16. In the preferred embodiment, the bulbous portions 16 contain grooves 19 that facilitate chewing of the dental hygiene device 10 by the animal at varied angles. As the animal chews on the bulbous portions 16, the protrusions 18 may act to clean the animal's teeth and under the gumline.

It is to be understood that the invention is not confined to the particular construction and arrangement of parts herein illustrated and described, but is intended to embrace all such modified forms thereof which come within the scope of the claims.

I claim:

1. A dental hygiene device for animals with gums and upper and lower teeth, the device comprising a body made of a tough, flexible rubber-like material, and two sets of opposing spiral grooves.

2. The dental hygiene device of claim 1 wherein the grooves taper inwardly.

3. The dental hygiene device of claim 1 wherein the dental hygiene device further comprises a longitudinal axis and wherein the body is formed to define a hollow core along the longitudinal axis of the body.

4. The dental hygiene device of claim 3 wherein material is threaded along the hollow core.

5. A dental hygiene device for animals with gums and upper and lower teeth, the device comprising a body made of a tough, flexible rubber-like material, and a plurality of opposing spiral grooves formed in the body, the body having two ends, each end having a bulbous portion containing grooved protrusions.

6. A dental hygiene device for animals with upper and lower teeth, the device comprising:

a bone-shaped body having two ends with a bulbous portion on each end, the bone-shaped body being formed of a flexible rubber-like material, sufficiently tough to be able to prevent a dog from biting through the body; and two sets of opposing spiral grooves formed in the body, the grooves being spaced so that when an animal bites into the device, the animal's upper and lower teeth enter the grooves at the same time.

7. A dental hygiene device for animals with upper and lower teeth, the device comprising:

a longitudinal axis;

a bone-shaped body having two ends with a bulbous portion on each end, the bone-shaped body being formed of a flexible rubber-like material, sufficiently tough to be able to prevent a dog from biting through the body, the bone-shaped body being formed to define a hollow core along the longitudinal axis of the body; and a plurality of grooves formed in the body, the grooves being spaced so that when an animal bites into the device, the animal's upper and lower teeth enter the grooves at the same time.

8. The dental hygiene device of claim 7 wherein material is threaded along the hollow core.

* * * * *